Jan. 21, 1969 W. A. SMALL ET AL 3,423,027
MOBILE ADJUSTABLE SPRAYER
Filed April 19, 1967 Sheet 1 of 4
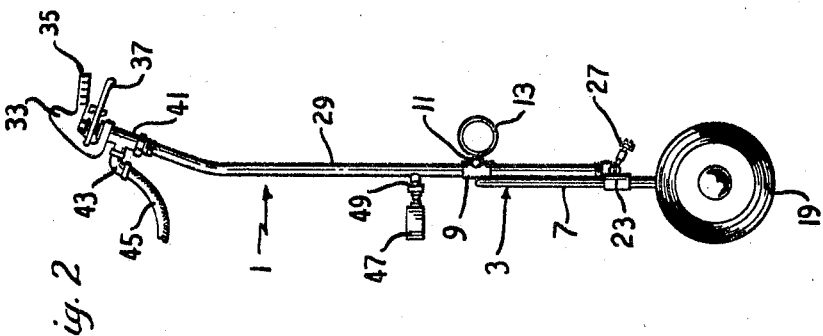
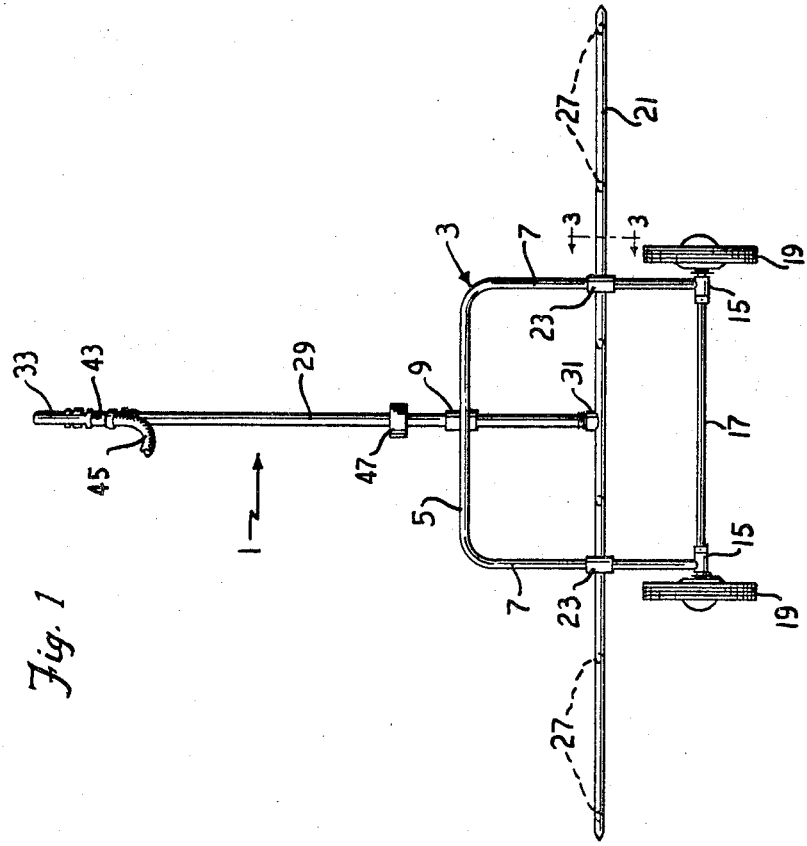
William A. Small,
Fred J. Ginther,
Inventors.
Koenig, Senniger, Powers and Leavitt,
Attorneys.

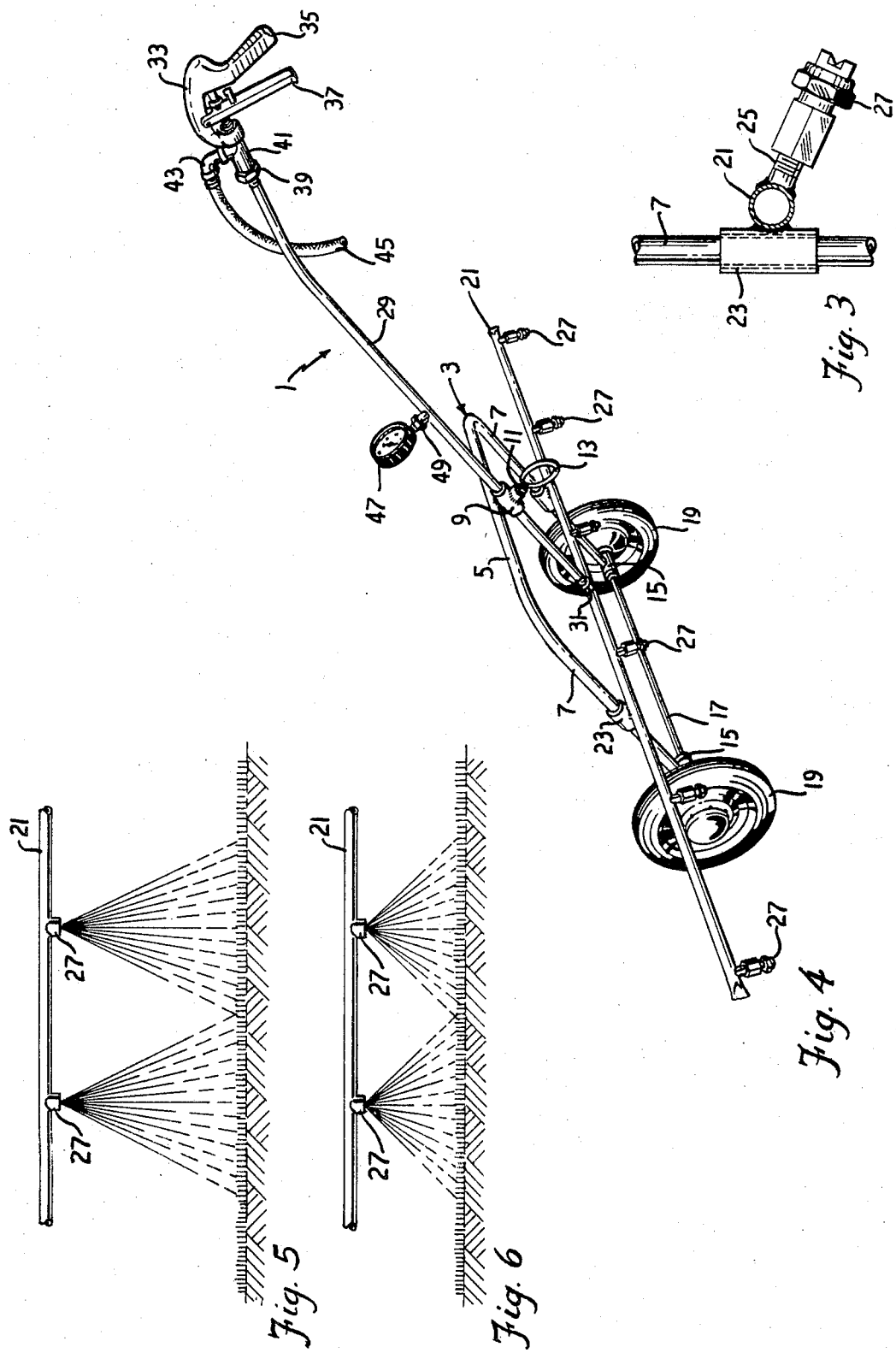

United States Patent Office 3,423,027
Patented Jan. 21, 1969

3,423,027
MOBILE ADJUSTABLE SPRAYER
William A. Small, Ferguson, and Fred J. Ginther, Shrewsbury, Mo., assignors to Mallinckrodt Chemical Works, St. Louis, Mo., a corporation of Missouri
Continuation-in-part of application Ser. No. 610,153, Jan. 18, 1967. This application Apr. 19, 1967, Ser. No. 634,416
U.S. Cl. 239—287          9 Claims
Int. Cl. B05b 9/02; B62b 1/00

ABSTRACT OF THE DISCLOSURE

A sprayer intended to be wheeled across the ground for spraying a liquid thereon, particularly for treating golf greens and other turf. The sprayer includes an inverted U-shaped frame having an axle secured at the lower ends of the frame legs and a pair of wheels rotatably mounted thereon. A transverse spray boom having a plurality of spray nozzles is slidably received on the frame legs and a liquid supply handle is secured to the center of the boom. A tubular guide is secured to the center of the crossbar portion of the frame, and either the supply handle or a transverse guide bar affixed thereto is slidably received in the guide. At the top of the handle is a control valve having an inlet for connection to an external supply of pressurized liquid to be sprayed, the valve delivering liquid to the handle and thence to the boom, from which it sprays out through the nozzles.

Cross-reference to related application

This application is a continuation-in-part of our copending application Ser. No. 610,153, filed Jan. 18, 1967 now abandoned.

Background of the invention

The invention pertains to sprayers, and particularly to an adjustable sprayer intended to be manually wheeled across the ground for spraying a liquid thereon. It is known that the correct quantity of liquid to be sprayed on a given area varies with the type of liquid sprayed and the condition of the ground upon which it is sprayed. Therefore, sprayers have generally been provided with a device for regulating the pressure of the liquid to obtain a desired quantity of sprayed liquid per unit area. A problem has arisen, however, in that different spray pressures produce different spray patterns which, if not compensated for, produce an uneven distribution of the sprayed liquid. This may be corrected by providing for height adjustment of the spray nozzles so that the nozzles may be positioned closer to or farther from the ground in accordance with the spray pressure, thereby producing ful coverage for any given pressure without excessive overlapping of spray patterns and waste.

Summary of the invention

Accordingly, the present invention provides a mobile sprayer including a frame having a pair of depending leg portions with a tubular guide secured therebetween. An axle carrying a pair of wheels is secured to the lower ends of the leg portions. A pair of tubular sleeves is secured to a transverse tubular spray boom, and the sleeves are slidably received on the respective leg portions of the frame for up and down sliding movement of the boom. This provides for rigid, positive alignment of the boom horizontal to the ground. The boom is provided with a plurality of spray nozzles spaced at intervals along its length. The lower end of a tubular supply handle is secured to the center of the boom. A manually operable valve is secured to the upper end of the handle, the valve having an inlet fitting thereon for connection to a supply of liquid to be sprayed. The invention therefore attains the object of providing a sprayer in which the height of the spray nozzles may be easily adjusted in small increments by sliding the boom up or down to provide full coverage without excessive overlapping for any desired spray pressure. This makes it possible to use nozzles with a wide angle coverage and operate them close to the ground where wind currents have little opportunity to distort the spray pattern or cause the spray to be blown upon sensitive plants or the operator. Other objects and features will be in part apparent and in part pointed out hereinafter.

Brief description of the drawings

FIG. 1 is a front elevation of the present sprayer;
FIG. 2 is a side elevation of the sprayer;
FIG. 3 is a section on line 3—3 of FIG. 1;
FIG. 4 is a perspective view of the sprayer;
FIGS. 5 and 6 illustrate two spray patterns for different spray pressures with the spray boom positioned at two different heights according to the patterns.

Corresponding reference characters indicate corresponding parts throughout the several views of the drawings.

Description of the preferred embodiments

Figure 7:
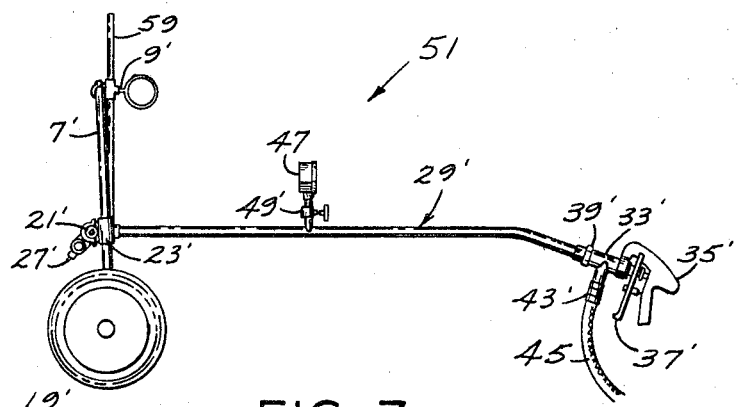
FIG. 7 is a side elevation of an alternative sprayer.

Referring now to FIGS. 1–4, a mobile adjustable sprayer of this invention, generally indicated by reference character 1, is shown to comprise an inverted U-shaped frame member 3 having an upper crossbar 5 and a pair of depending side leg portions 7. A tubular guide 9 is secured to the center of the crossbar 5 of the frame 3 by any suitable means, such as welding, and is provided with a threaded aperture for receiving a threaded set screw 11 having a ring 13 for easy manual turning of the screw without tools and from which the sprayer may be supported when not in use. A pair of sleeve bearings 15 are secured to the lower ends of the legs 7 of the frame 3 for supporting an axle 17 carrying a pair of semi-penumatic wheels 19. The wheels 19 may either be rotatably mounted with respect to the axle 17 or fixed to the axle 17 for rotation with the latter in the bearings 15.

A tubular spray boom or pipe 21 is mounted on the frame 3 for up and down sliding movement relative thereto by a pair of tubular sleeves 23 welded or clamped to the boom 21 and slidably received on the leg portions 7. As best illustrated in FIGS. 3 and 4, the boom 21 is provided with a plurality of threaded fittings 25 spaced at equal intervals along its length for receiving a corresponding plurality of atomizing spray nozzles 27. A tubular supply handle 29 is slidably received within the tubular guide 9 and is secured at its lower end in fluid conducting relationship to the center of the boom 21 by a threaded fitting 31. A central valve 33 having a handle 35 and a trigger 37 is secured to the upper end of the tubular handle 29 by a fitting 39 at the end of a barrel 41. The control valve 33 is of conventional construction, such as shown in U.S. Patent 2,956,752, for example, and is provided with an inlet fitting 43. The fitting 43 may be of the swivel elbow type for connection to a hose 45 leading from a mobile supply tank and compressor (not shown). A pressure gauge 47 is mounted on the tubular handle 29 near its midpoint by a fitting 49 for indicating the pressure of the fluid within the handle 29.

The frame 3 may be constructed of a single piece of tubing or of separate lengths of tubing secured together by elbow fittings. The boom 21, in a preferred structural embodiment, is approximately six feet in length and is formed of corrosion resistant tubing having six atomizing spray nozzles spaced at approximately one foot intervals. The tubular handle 29 is also formed of corrosion resistant tubing and may be approximately four feet in length. It should of course be understood that various other materials and dimensions may be utilized depending upon the intended use of the sprayer.

In operation, the sprayer 1 may be used, for example, to spray a liquid fungicide on the greens of a golf course and would, therefore, be transported to the golf course green along with a wheeled vehicle carrying a fungicide supply tank and a pump. The sprayer operator connects the hose 45 from the tank to the fitting 43, selects, from a chart, the proper pressure of the fungicide solution to apply a predetermined quantity over a given area at the usual walking rate, and adjusts the liquid pressure accordingly. For example, if five gallons of fungicide solution are to be applied per one thousand square feet of area, the operator will adjust the liquid pressure at the pump to provide the predetermined pressure at the boom as read on the gauge 47. If a lesser quantity of fungicide is to be sprayed, a lesser pressure will be used or a faster walking rate will be followed and if a greater quantity is to be sprayed a greater pressure will be used or a slower walking rate exercised. After selecting and setting the correct pressure, the operator adjusts the height of the spray boom 21 so that the spread of the spray pattern on the ground is slightly greater than the distance between adjacent spray nozzles, thus providing full coverage without excessive overlapping. This is accomplished very simply by loosening the set screw 11 and sliding the handle 29 up or down. When the boom 21 is at the proper height, the set screw 11 is tightened. FIGS. 5 and 6 illustrate two different positions of height adjustment of the spray boom 21 corresponding to two different spray pressures. In FIG. 5, the selected pressure is such that the spray patterns are relatively narrow, consequently the boom 21 is raised relatively high so that full coverage is obtained. In FIG. 6, the selected pressure is such that the spray patterns are relatively broad, and the spray boom 21 is positioned closer to the ground so that there is little overlap of the spray pattern.

Figure 8:
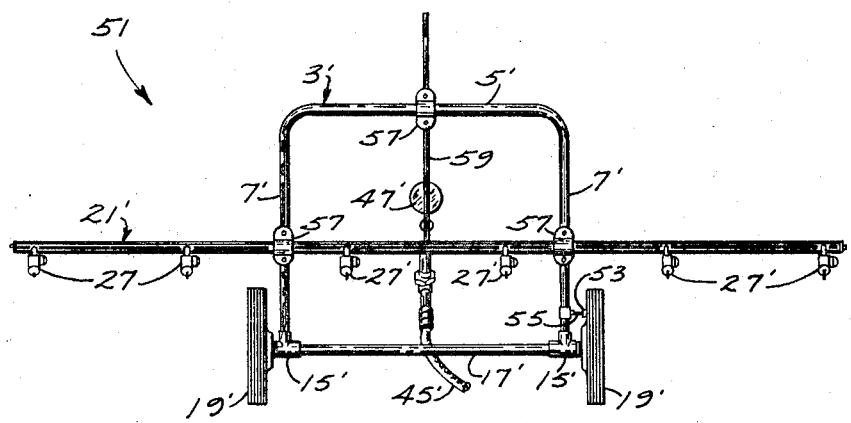
FIG. 8 is a front elevation of the sprayer of FIG. 7.
Figure 9:
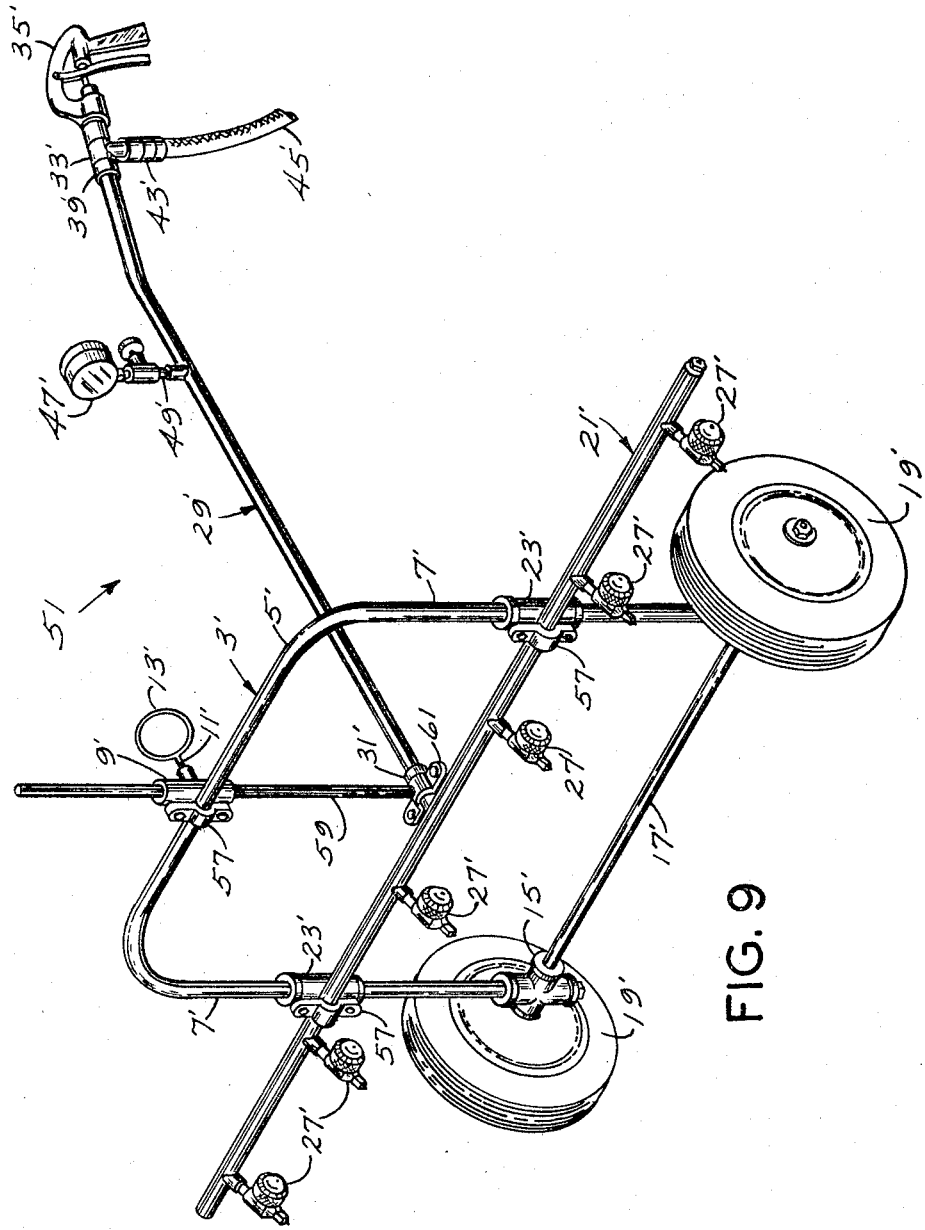
FIG. 9 is a perspective view of the sprayer of FIG. 7.

In the alternative embodiment of the sprayer illustrated in FIGS. 7-9, the supply handle extends transversely to the plane of the frame to decrease the weight held up the operator and improve the balance of the sprayer. This sprayer is preferably pulled, instead of pushed, over the turf so as to avoid having the wheels roll over the wetted ground (which would squeegee fungicide from under the wheels and cause overconcentration at the sides of the wheel tracks and underconcentration in the tracks).

Referring to FIGS. 7-9, the alternative sprayer, generally indicated by reference character 51, is comprised of an inverted U-shaped frame 3' having crossbar 5' and leg portions 7'. A guide 9' is secured to the crossbar 5' and is provided with a set screw 11' having a ring 13' secured thereto. A pair of sleeve bearings 15' secured to the legs 7' carry an axle 17' having wheels 19' at its ends. The right wheel 19' as viewed in FIG. 8, is provided with a projection 53 which strikes a metal tab or clicker 55 secured to the right leg 7' of frame 3' on each revolution of the wheel. Thus an audible signal is provided so that the operator may readily determine, and adjust if necessary, the rate at which the sprayer is being pulled over the turf. Alternatively, a radial stripe may be painted on the wheel to provide a visual indication of the speed of the sprayer.

A tubular spray boom 21' is mounted on the frame for up and down sliding movement by a pair of tubular sleeves 23' secured to the boom and slidable on the legs. The sleeves 23' and guide 9' may be secured to the boom and frame, respectively, by saddle brackets 57, or by welding as illustrated in connection with sprayer 1. A plurality of atomizing spray nozzles 27' are spaced at equal intervals along the length of the boom 21' and may consist, for example, of the anti-drip nozzles illustrated in U.S. Patent 2,639,194.

A tubular supply handle 29' is secured at its lower end in fluid conducting relationship to the center of the boom 21' by a fitting 31'. A triangular reinforcing plate (not shown) may be affixed to the boom and handle at their intersection for increasing the strength thereof. A solid or tubular guide bar 59 is secured to handle 29' adjacent its lower end by a clamp 61, the bar 59 extending generally parallel to the legs 7' and being slidably received within the guide 9'. Alternatively, the guide bar 59 may be secured directly to the boom 21', either at its center or slightly off-center, and the guide 9' vertically aligned on the crossbar 5' for receiving the bar 59. Thus, the handle 29' is held transverse to the plane of the frame 3' by the bar 59 captured in guide 9'. This improves the balance of the sprayer and decreases the weight held by the operator, while permitting the sprayer to be easily pulled over the turf. A valve 33', trigger 37' and handle 35' are secured to the upper end of the supply handle 29' by a fitting 39'. The valve 33' is provided with an inlet fitting 43' for connection to a supply hose 45'. A pressure gauge 47' is mounted on the handle near its midpoint by a fitting 49'.

The operation of the alternative sprayer 51 is substantially the same as that described above with respect to sprayer 1. However, the height of the boom 21' is adjusted by loosening the set screw 11' and sliding the bar 59 in guide 9' and the boom sleeves 23' on legs 7'. When the boom is at the proper height, set screw 11' is tightened by means of ring 13'. As set forth above, the height of the boom is dependent on the spray pressure which, in turn, is a function of the desired quantity of liquid to be sprayed per unit area.

When all of the adjustments have been made and the correct spray pressure selected, the operator merely grasps the spray handle 35', squeezes the trigger 37' which opens valve 33' and permits liquid to flow to the spray nozzles 27', tilts the sprayer 53 to a comfortable position, and pulls it over the turf. Thus, the wheels 19' do not roll over the wetted ground and disturb the fungicide distribution. Additionally, the operator can control his rate of walking for proper spray distribution by listening to the audible clicks produced by the clicker 55, or by observing the stripe on the wheel.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:
1. A mobile ground sprayer comprising:
   a frame having a pair of depending leg portions and a guide secured therebetween;
   wheels at the lower ends of the leg portions;
   a transverse tubular spray boom having a pair of sleeves secured thereto, said sleeves being slidably received on the respective leg portions of said frame for up and down sliding movement of the boom, said spray boom having a plurality of spray nozzles spaced along its length;
   a tubular supply handle having its lower end secured in fluid conducting relationship to the boom; and
   a manually operable valve at the upper end of said handle having an inlet adapted for connection of a line from a pressurized source of supply and having an outlet connected to said handle, whereby said boom is slidably adjustable on said leg portions to different heights relative to the ground.
2. A sprayer as in claim 1 wherein said supply handle is slidably received in said guide.
3. A sprayer as in claim 2 further comprising:

a fastener associated with said guide for holding said handle and spray boom in adjusted position.

4. A sprayer as in claim 1 further comprising a guide bar interconnected to said boom and extending generally parallel to said leg portions, said bar being slidably received within said guide, said handle extending generally transverse to the plane of said frame.

5. A sprayer as in claim 4 further comprising a fastener associated with said guide for holding said handle and spray boom in adjusted position.

6. A sprayer as in claim 1 wherein:
said frame comprises an inverted U-shaped member, and said guide is secured to the center of the crossbar thereof.

7. A sprayer as in claim 1 further comprising:
a pressure gauge mounted on said handle for indicating the pressure of the liquid therein.

8. A mobile ground sprayer comprising:
an inverted U-shaped frame having a crossbar and a pair of depending side leg portions, said frame having a tubular guide secured to the center of said crossbar;
an axle mounted at the lower ends of said leg portions and carrying a pair of wheels;
a transverse tubular spray boom having a plurality of spray nozzles spaced at equal intervals along its length, said boom having a pair of tubular sleeves secured thereto on opposite sides of its center, said sleeves being slidably received on the respective leg portions of said frame for up and down sliding movement of the boom;
a tubular supply handle slidably received within said guide and having its lower end secured in fluid conducting relationship to the center of said boom, said guide having set screw locking means for adjustably securing said boom and handle to said frame;
a control valve secured to the upper end of said handle;
a pressure gauge secured to said handle for indicating the pressure therein; and
an inlet fitting secured to said control valve for connection to a line from a pressurized source of supply.

9. A mobile ground sprayer comprising:
an inverted U-shaped frame having a crossbar and a pair of depending side leg portions, said frame having a tubular guide secured to the center of said crossbar;
an axle mounted at the lower ends of said leg portions and carrying a pair of wheels;
a transverse tubular spray boom having a plurality of spray nozzles spaced at equal intervals along its length, said boom having a pair of tubular sleeves secured thereto on opposite sides of its center, said sleeves being slidably received on the respective leg portions of said frame for up and down sliding movement of the boom;
a tubular supply handle having its lower end secured in fluid conducting relationship to the center of said boom, said handle having a guide bar secured to its lower end and extending generally parallel to said leg portions, said bar being slidably received within said guide for holding said handle generally transverse to the plane of said frame, said guide having set screw locking means for adjustably securing said boom and handle to said frame;
a control valve secured to the upper end of said handle;
a pressure gauge secured to said handle for indicating the pressure therein; and
an inlet fitting secured to said control valve for connection to a line from a pressurized source of supply.

References Cited
UNITED STATES PATENTS

| 1,526,642 | 2/1925 | Nissley | 239—286 X |
| 3,153,509 | 10/1964 | Curtis | 239—164 X |

M. HENSON WOOD, Jr., *Primary Examiner.*

M. Y. MAR, *Assistant Examiner.*

U.S. Cl. X.R.

280—47.26